United States Patent

Shizuno et al.

Patent Number: 5,525,397
Date of Patent: Jun. 11, 1996

[54] CLEANING SHEET COMPRISING A NETWORK LAYER AND AT LEAST ONE NONWOVEN LAYER OF SPECIFIC BASIS WEIGHT NEEDLED THERETO

[75] Inventors: Akihito Shizuno; Hiroyuki Yanagida, both of Tochigi-ken, Japan

[73] Assignee: Kao Corporation, Tokyo, Japan

[21] Appl. No.: 355,155

[22] Filed: Dec. 8, 1994

[30] Foreign Application Priority Data

Dec. 27, 1993 [JP] Japan ................................ 5-333310

[51] Int. Cl.⁶ ........................ A47L 13/10; A47K 7/02; B32B 3/10; B32B 5/02
[52] U.S. Cl. .................... 428/138; 15/208; 15/209.1; 15/229.11; 15/229.12; 428/234; 428/300
[58] Field of Search ............................ 428/234, 235, 428/300, 299, 138; 15/208, 209.1, 229.11, 229.12, 40

[56] References Cited

U.S. PATENT DOCUMENTS

| | | | |
|---|---|---|---|
| 1,945,823 | 2/1934 | Rasch et al. | 15/230 |
| 3,148,105 | 9/1964 | Johnson | 428/234 |
| 3,629,047 | 12/1971 | Davison | 428/234 |
| 3,965,519 | 6/1976 | Hermann | 15/104.93 |
| 4,276,338 | 6/1981 | Ludwa et al. | 428/137 |

FOREIGN PATENT DOCUMENTS 63-48981   3/1988   Japan .

*Primary Examiner*—James D. Withers
*Attorney, Agent, or Firm*—Birch, Stewart, Kolasch & Birch

[57] ABSTRACT

A cleaning sheet comprises a network sheet and a nonwoven fiber aggregate formed by the entanglement of fibers of a fiber web and disposed on at least one side of the network sheet. The fibers of the nonwoven fiber aggregate are further entangled with the network sheet, forming a unitary body. The cleaning sheet has the breaking strength of 500 g/30 mm or more, and the elongation at a load of 500 g/30 mm is 10% or less. The fiber aggregate has the entanglement coefficient of from 10 to 500 m. The entanglement coefficient is expressed by the initial gradient of the stress-strain curve measured with respect to the direction perpendicular to the fiber orientation in the fiber aggregate.

6 Claims, 4 Drawing Sheets

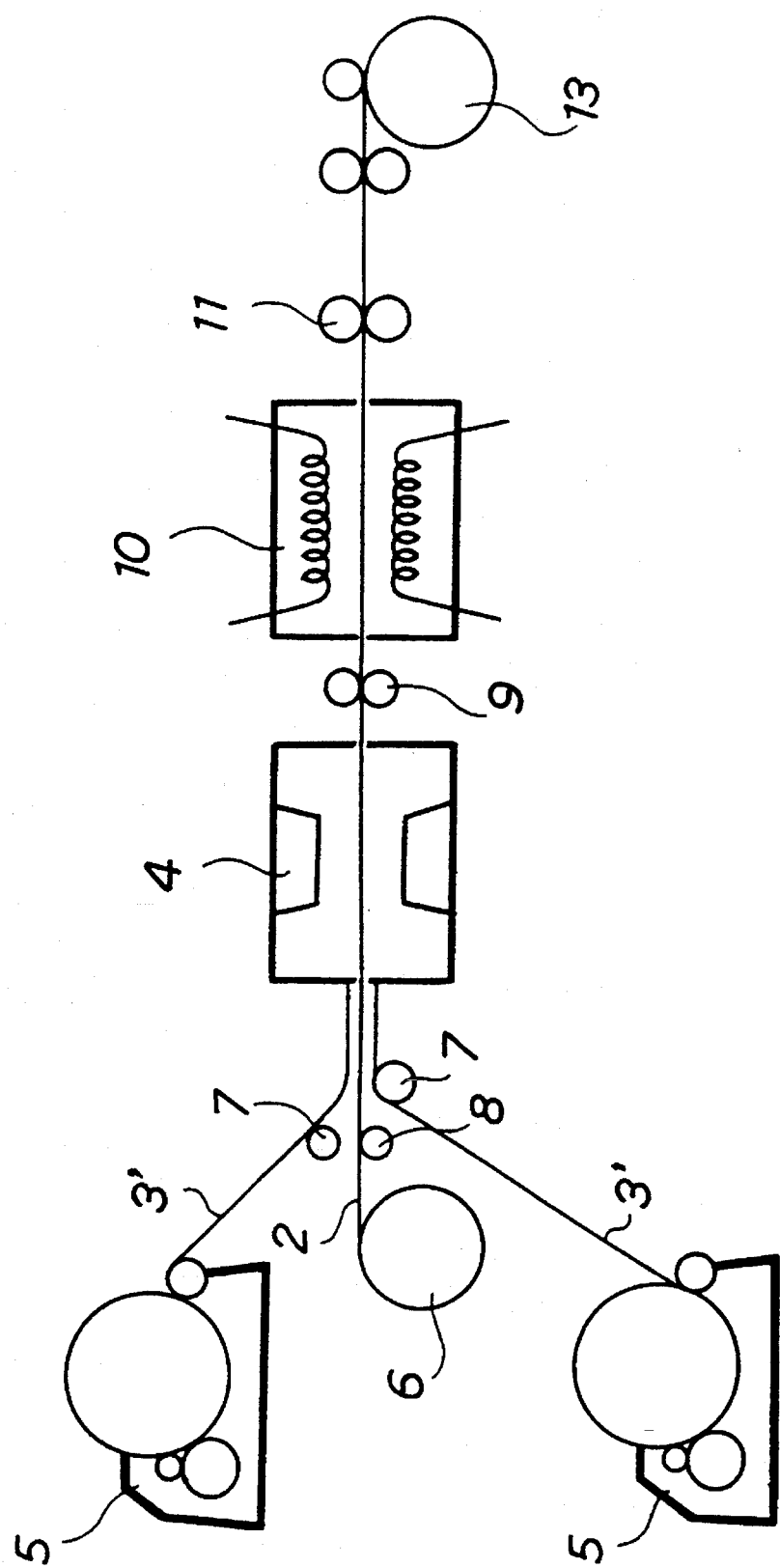

CLEANING SHEET COMPRISING A NETWORK LAYER AND AT LEAST ONE NONWOVEN LAYER OF SPECIFIC BASIS WEIGHT NEEDLED THERETO

BACKGROUND OF THE INVENTION

1. Field of the Invention

This invention relates to a cleaning sheet for business use or for home use, which utilizes nonwoven fabrics. More particularly, this invention relates to a dry-type cleaning sheet for the purposes of collecting various kinds of dust.

2. Description of the Related Art

Dry-type cleaning sheets, which have heretofore been used as cleaning dusters, generally comprise woven fabrics, nonwoven fabrics or the like which are impregnated with oily substances. The cleaning sheets absorb and remove dirt on surfaces which are to be cleaned, by the action of wetting of the oily substances.

In the cleaning sheets utilizing nonwoven fabrics, fibers are firmly joined together through adhesion, fusion or stronger entanglement of the fibers, such that the cleaning sheets may not generate waste pieces of fibers or may not break during the cleaning operations. Such cleaning sheets can adsorb small-sized dirt particles, such as soil dust, by the action of wetting of the impregnated oily substances. However, the cleaning sheets do not have satisfactory collecting performance with respect to large-sized dust, such as lint, waste pieces of fibers, and hair.

SUMMARY OF THE INVENTION

In order for large-sized dust, such as lint, waste pieces of fibers, and hair, to be collected, the entanglement of fibers is required such that the degree of freedom of the fibers may be kept high. In general, a nonwoven fabric which is formed by the entanglement of fibers involves a higher degree of freedom of the constituent fibers, than in a nonwoven fabric, which is formed only by adhesion or fusion of fibers. Therefore, the nonwoven fabric which is formed by the entanglement of the fibers can exhibit a better dust collecting performance through the entanglement between dust and the fibers of the nonwoven fabric. It is considered that a nonwoven fabric in which the entanglement of the fibers is weaker exhibits a better dust collecting performance. However, if the entanglement of fibers is very weak, the strength of the nonwoven fabric will become markedly low, and the processability of the nonwoven fabric will become bad. Also, shedding of the fibers from the nonwoven fabric will occur easily.

It is therefore an object of the present invention is to provide a cleaning sheet, which is capable of satisfying both of the requirements with respect to the strength necessary for a cleaning operation and the degree of freedom of the constituent fibers necessary for dust collecting performance.

The inventors eagerly studied in order to accomplish the aforesaid object, and found that a sheet having desired physical properties can be obtained by preparing a sheet comprising a network sheet and a fiber aggregate, which are overlaid one upon the other and entangled with each other and combined into a unitary body by water needling or the like, and by adjusting the degree of the entanglement of the fibers in the sheet with one another such that it may fall within a certain range.

The present invention is based on the findings described above. Specifically, the present invention provides a cleaning sheet comprising a network sheet and a nonwoven fiber aggregate formed by the entanglement of fibers of a fiber web, the fiber aggregate being disposed on at least one side of the network sheet, the fibers of the fiber aggregate being further entangled with the network sheet, forming a unitary body;

the cleaning sheet having the breaking strength of 500 g/30 mm or more, and the elongation at a load of 500 g/30 mm of 10% or less; and the fiber aggregate having the entanglement coefficient of from 10 to 500 m, the entanglement coefficient being expressed by the initial gradient of the stress-strain curve measured with respect to the direction perpendicular to the fiber orientation in the fiber aggregate.

The breaking strength as used herein means the value of a load (i.e. the first peak value during the measurement of the tensile strength) at which the cleaning sheet begins to break when a tensile load is applied to the cleaning sheet. The elongation as used herein means the elongation (%) of the cleaning sheet when a tensile load of 500 g/30 mm is applied to the cleaning sheet.

The entanglement coefficient as used herein is a measure representing the degree of entanglement of fibers in the fiber aggregate. The entanglement coefficient is expressed by the initial gradient of the stress-strain curve measured with respect to the direction perpendicular to the fiber orientation in the nonwoven fiber aggregate in the cleaning sheet. A smaller value of the entanglement coefficient represents smaller degree of entanglement of the fibers. The stress as used herein means a value which is obtained by dividing the tensile load value by the chucking width (i.e. the width of the test strip during the measurement of the tensile strength) and the basis weight of the nonwoven fiber aggregate. The strain as used herein means the elongation.

With the cleaning sheet in accordance with the present invention, both of the requirements with respect to the strength necessary for a cleaning operation and the degree of freedom of the fibers necessary for the dust collecting performance can be satisfied.

BRIEF DESCRIPTION OF THE DRAWINGS

The invention will be more particularly described with reference to the accompanying drawings, in which:

FIG. 5 is a schematic view showing an example of an apparatus for producing the cleaning sheet in accordance with the present invention.

DETAILED DESCRIPTION OF THE INVENTION

Figure 1:
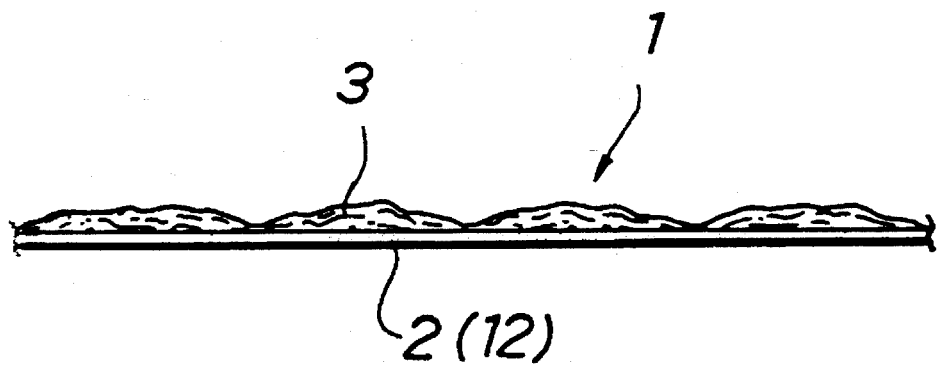
FIG. 1 is a sectional view showing an embodiment of the cleaning sheet in accordance with the present invention.

FIG. 1 is a sectional view showing an embodiment of the cleaning sheet in accordance with the present invention.

Figure 2:
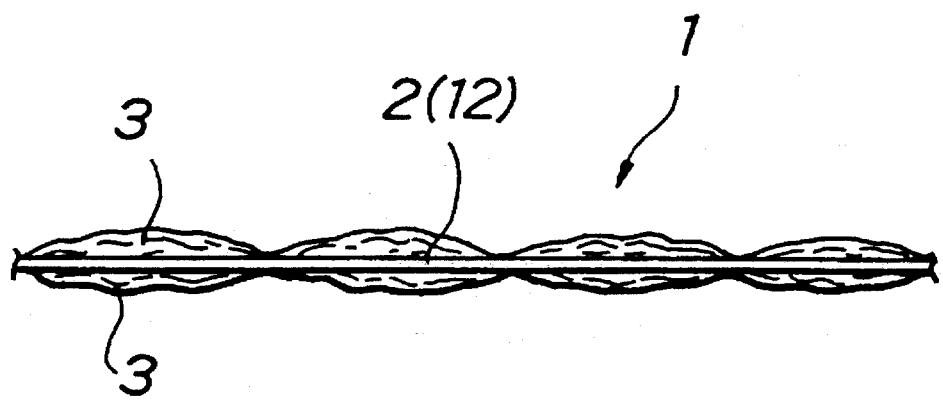
FIG. 2 is a sectional view showing another embodiment of the cleaning sheet in accordance with the present invention.

FIG. 2 is a sectional view showing another embodiment of the cleaning sheet in accordance with the present invention. FIG. 3 and FIGS. 4A, 4B, and 4C are plan views showing network sheets which are used in the cleaning sheet in accordance with the present invention.

A cleaning sheet 1 shown in FIG. 1 comprises a network sheet 2 (or 12) and a nonwoven fiber aggregate 3. The nonwoven fiber aggregate 3 which is formed by the entanglement of fibers of a fiber web is disposed on one side of the network sheet 2 (or 12). The fibers of the nonwoven fiber aggregate 3 are further entangled with the network sheet 2(or 12). Thus, the nonwoven fiber aggregate 3 and the network sheet 2 (or 12) form a unitary body.

A cleaning sheet 1 shown in FIG. 2 comprises a network sheet 2 (or 12) and two nonwoven fiber aggregates 3, 3. The nonwoven fiber aggregates 3, 3 which are formed by the entanglement of fibers of fiber webs are disposed on opposite sides of the network sheet 2 (or 12). The fibers of the nonwoven fiber aggregates 3, 3 are further entangled with the network sheet 2 (or 12). Thus, the nonwoven fiber aggregates 3, 3 and the network sheet 2 (or 12) form a unitary body.

Figure 3:
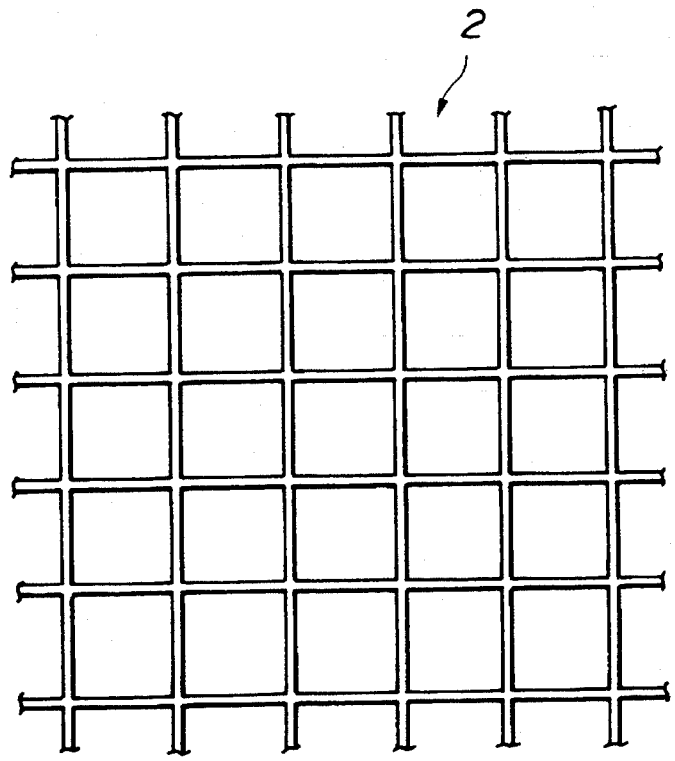
FIG. 3 is a plan view showing a network sheet which is used in the cleaning sheet in accordance with the present invention.
Figure 4A:
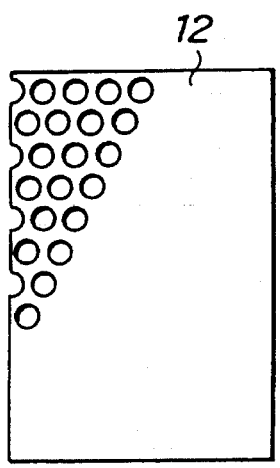
FIGS. 4A, 4B and 4C are plan views showing other network sheets which are used in the cleaning sheet in accordance with the present invention.
Figure 4B:
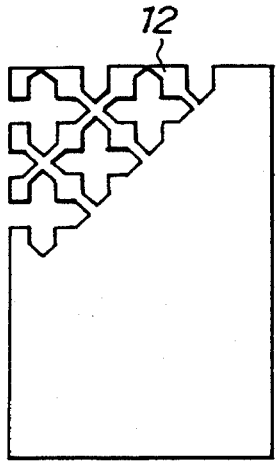
Figure 4C:
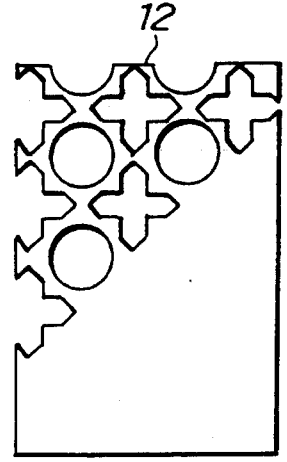

Preferred examples of the network sheet 2 include a grating-like net as shown in FIG. 3. Alternatively, one of perforated films 12, 12, 12 which are shown in FIGS. 4A, 4B and 4C and having a plurality of perforations may be employed as the network sheet 2. The network sheet 2 may be made from any materials having certain perforations and having the function as a support with which the fibers of the fiber aggregate 3 can be further entangled, forming a unitary body.

As shown in FIG. 3 and FIGS. 4A, 4B and 4C, the shape of the perforations made through the network sheet 2 and 12 may be modified in various manners. The perforations made through the film 12 may have a circular shape as shown in FIG. 4A, may have a star shape as shown in FIG. 4B or may be of the combination of the circular shape and the star shape as shown in FIG. 4C.

The material of the network sheet 2 and 12 may be selected from, for example, polyolefins such as polyethylene, polypropylene and polybutene; polyesters such as polyethylene terephthalate and polybutylene terephthalate; polyamides such as nylon 6 and nylon 66; acrylonitriles; vinyl polymers and vinylidene polymers such as polyvinyl chloride and polyvinylidene chloride; and modified polymers, alloys or mixtures thereof.

In cases where the network sheet 2 comprises the net as shown in FIG. 3, the mesh, the fiber diameter, the distance between fibers, the diameter of the hole, the pitch between the holes and the configuration of the holes should be determined from the view point of the local entanglement with the nonwoven fiber aggregate. Specifically, the diameter preferably falls within the range of 20 mm to 500 mm, and more preferably falls within the range of 100 mm to 200 mm. The distance between fibers preferably falls within the range of 2 mm to 30 mm, and more preferably falls within the range of 4 mm to 20 mm.

In cases where the network sheet 12 comprises the perforated film as shown in FIG. 4A, 4B or 4C, the diameter of the perforation preferably falls within the range of 4 mm to 40 mm, and more preferably falls within the range of 8 mm to 20 mm. The pitch between the perforation preferably falls within the range of 1 mm to 10 mm, and should more preferably fall within the range of 1 mm to 5 mm. In cases where a sheet other than those described above is employed as the network sheet, the hole diameter and the like can be determined in the same manner as that in the network sheet shown in FIG. 3 or FIG. 4A, 4B, or 4C.

The fibers used in the fiber aggregate 3 may be selected from, for example, thermoplastic fibers such as polyesters, polyamides and polyolefins; composite fibers thereof, divided fibers thereof, and ultra thin fibers thereof produced by a melt blown process; semi-synthetic fibers such as acetate fibers; regenerated fibers such as cupra and rayon; natural fibers such as cotton and blends of cotton and other fibers.

The basis weight of the nonwoven fiber aggregate 3 preferably falls within the range of 40 to 100 g/m$^2$, more preferably 40 to 70 g/m$^2$. If the basis weight of the nonwoven fiber aggregate 3 is smaller than 40 g/m$^2$, dust will easily pass through the cleaning sheet during the cleaning operation, and therefore hands will become stained. If the basis weight of the nonwoven fiber aggregate 3 is larger than 100 g/m$^2$, the fiber in the fiber aggregate and the network sheet cannot be sufficiently entangled with each other at a desired degree of entanglement. In addition, the processability will become bad, and the shedding of the fibers from the cleaning sheet will occur more frequently.

The denier, the length, the cross-sectional shape and the strength of the fibers used in the nonwoven fiber aggregate should be determined from the view point of the processability and the cost. In accordance with the functions required for the cleaning sheet, the nonwoven fiber aggregate may be combined with a surface-active agent or a lubricant, which can improve the surface physical properties of the fiber aggregate and can adsorb dust, or combined with a lubricant which imparts gloss to the surface to be cleaned.

It is important for the cleaning sheet in accordance with the present invention, which comprises the network sheet and the fiber aggregate, that the breaking strength of the cleaning sheet is 500 g/30 mm or more, preferably 1000 g/30 mm or more, that the elongation at a load of 500 g/30 mm is 10% or less, preferably 7% or less, and that the entanglement coefficient of the fiber aggregate falls within the range of 10 to 500 m.

If the breaking strength of the cleaning sheet is lower than 500 g/30 mm, the cleaning sheet will tend to break during the cleaning operation. The elongation of the cleaning sheet is preferably as low as possible. If the elongation of the cleaning sheet at a load of 500 g/30 mm is greater than 10%, distortion or twisting of the cleaning sheet will occur during the cleaning operation, and therefore the cleaning sheet will become inconvenient to handle. These problems will be aggravated when the cleaning sheet is attached to a cleaning tool such as a mop handle, and used for the cleaning operation.

In cases where the entanglement coefficient of the fiber aggregate, which is expressed by the initial gradient of the stress-strain curve measured with respect to the direction perpendicular to the fiber orientation, is to be set at a value not greater than 500 m, as in the cleaning sheet in accordance with the present invention, it is difficult for a sheet, which is constituted only of a fiber aggregate, to achieve the values of the breaking strength and the elongation described above. Therefore, in order to set the entanglement coefficient at a value not larger than 500 m, it is important that the network sheet and the fiber aggregate are entangled and combined with each other into a unitary body as in the present invention. Also, with the cleaning sheet in accordance with the present invention, the fiber aggregate is entangled and combined with the network sheet into a unitary body, and the elongation is thereby kept low. Therefore, the shedding of the fibers from the cleaning sheet in accordance with the present invention is prevented markedly as compared with a conventional entangled sheet, which is constituted only of a fiber aggregate in approximately the same entanglement state as that in the fiber aggregate of the cleaning sheet in accordance with the present invention.

If the entanglement coefficient is smaller than 10 m, the fibers will not be sufficiently entangled together. In addition, the entanglement between the fibers and the network sheet becomes poor. As a result, shedding of the fibers will occur frequently. If the entanglement coefficient is greater than 500 m, a sufficient degree of freedom of the fibers cannot be obtained due to too strong entanglement, the fibers cannot be easily entangled with dust, and the dust collecting performance cannot be kept good.

In the present invention, it is necessary that the entanglement coefficient falls within the range of 10 to 500 m as mentioned above. The entanglement coefficient preferably falls within the range of 50 to 250 m, more preferably within the range of 70 to 120 m.

The degree of the entanglement of the fibers depends on the entanglement energy applied to the fiber web during the entanglement process. For example, in the water needling process, the entanglement energy applied to the fiber web can be controlled from the view point of the kind of the fibers, the basis weight of the fiber web, the number of water jet nozzles, and water pressure and the line speed.

The process for producing the cleaning sheet in accordance with the present invention will hereinbelow be described in detail.

When the cleaning sheet in accordance with the present invention is to be made, a fiber web is overlaid upon one side of the network sheet, or fiber webs are overlaid upon opposite side of the network sheet. In this state, by applying water jet, the fibers of the fiber web, which is located on one side of the network sheet, are entangled with the fibers of the fiber web which is located on the other side of the network sheet. Also, the fibers of the fiber webs are further entangled with the network sheet. At the same time, apart from the above entanglement, the fibers of each fiber web are caused to be entangled with one another and are fixed as a non-woven fiber aggregate to the network sheet. The process for producing the cleaning sheet in accordance with the present invention is made will hereinbelow be described in greater detail with reference to FIG. 5.

FIG. 5 is a schematic view showing an example of an apparatus for producing the cleaning sheet in accordance with the present invention. The apparatus is employed to produce the cleaning sheet having the structure shown in FIG. 2.

With the apparatus shown in FIG. 5, fiber webs 3', 3' are continuously delivered from carding machines 5, 5, via delivery rolls 7, 7. A feed roll 6 for a network sheet 2 is located between the carding machines 5, 5. The network sheet 2 is delivered from the feed roll 6 via a delivery roll 8.

The fiber webs 3', 3' are superposed upon the opposite sides of the network sheet 2 at the point of the delivery rolls 7, 7, and the combination of the fiber webs 3', 3' and the network sheet 2 is conveyed into a water needling unit 4. In the water needling unit 4, the fibers of the fiber webs 3', 3' are entangled with the network sheet 2 by the action of water jet. Also, the fiber webs 3', 3', which are located on opposite surfaces of the network sheet 2, are entangled with each other. In this manner, a sheet is prepared.

After the entanglement, the sheet, which thus comprises of the fiber aggregates 3, 3 (not shown in the Figure) and the network sheet 2, is passed between nip rolls 9, 9 and conveyed into a heating unit 10. In the heating unit 10, the sheet is subjected to heat treatment for drying. The sheet after being subjected to the heat treatment is passed between nip rolls 11, 11 and is wound around a winder 13. In this manner, the cleaning sheet in accordance with the present invention, which has the structure shown in FIG. 2, is obtained.

The invention will be understood more readily with reference to the following examples; however these examples are intended to illustrate the invention and are not to be construed to limit the scope of the invention.

As for sheets obtained in Examples 1, 2, 3 and 4 and Comparative Examples 1, and 2, the tests and evaluations (1) through (6) described below were carried out. The results of the evaluations are shown in Table 1.

Test Methods:

(1) Breaking strength (transverse direction)

From each of the sheets, samples having a width of 30 mm were cut out in the direction perpendicular to the fiber orientation in the sheet. The sample was chucked with a chuck-to-chuck distance of 100 mm in a tensile testing machine, and was elongated at a rate of 300 mm/min in the direction perpendicular to the fiber orientation. The value of load at which the sheet begun to break (the first peak value of the continuous curve obtained by the measurement) was taken as the breaking strength.

(2) Elongation at a load of 500 g/30 mm

The elongation of the sample, at a load of 500 g in the measurement of the breaking strength described above, was measured.

Also, the elongation was evaluated in view of the handling property with three scales described below, taking into consideration distortion and twisting of the sheet during the cleaning operation.

o: Distortion and twisting did not occur, and the handling property is acceptable.

Δ: Distortion and twisting often occurred, and the sheet was slightly inconvenient to handle.

x: Distortion and twisting occurred frequently, and the sheet was inconvenient to handle.

(3) Entanglement coefficient

From the nonwoven fiber aggregate (from which the network sheet had been removed), a sample having a width of 15 mm was cut out in the direction perpendicular to the fiber orientation in the sheet. The sample was chucked with a chuck-to-chuck distance of 50 mm in a tensile testing machine, and was elongated at a rate of 30 mm/min in the direction perpendicular to the fiber orientation. The tensile load value F [g] with respect to the elongation of the sample was measured. The value, which was obtained by dividing the tensile load value F [g] by the sample width [0.015 m] and the basis weight of the nonwoven fiber aggregate, W [g/m$^2$] was taken as the stress S [m], and a stress-strain (elongation) curve was obtained.

$$\text{Stress } S \text{ [m]} = (F/0.015)/W$$

Figure 6:
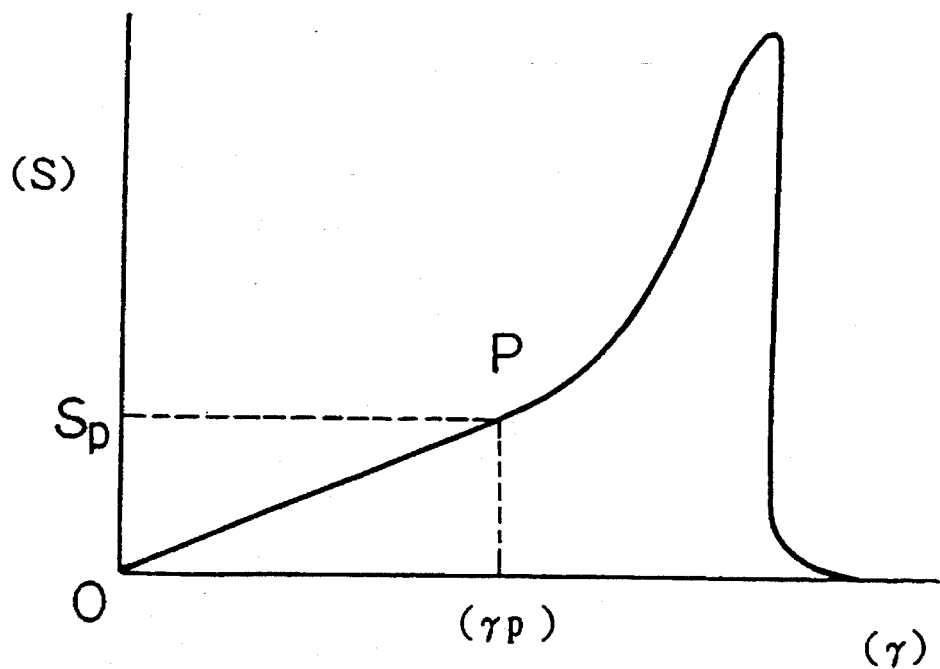
FIG. 6 is a graph showing a stress-strain curve.

As for a nonwoven fiber aggregate, which was constituted only by the entanglement of the fibers, a straight-line relationship obtained at the initial stage of the stress-strain (elongation) curve. The gradient of the straight line was calculated as the entanglement coefficient E [m]. For example, in a stress-strain (elongation) curve shown in FIG. 6 (wherein the vertical axis represents the stress, the horizontal axis represents the strain, and O represents the point of intersection), the limit of straight-line relationship is represented by P, the stress at P is represented by $S_P$, and the strain (elongation) at P is represented by $\gamma_P$. In such cases, the entanglement coefficient is calculated as $E=S_P/\gamma_P$ (When $S_P=60$ m and $\gamma_P=86\%$, E is calculated as $E=60/0.86=70$ m.)

It should be noted that the straight line OP is not always strictly straight. In such cases, the line OP should be approximated by a straight line.

(4) Shedding of fibers

A rubbing test was carried out mechanically. The amount of fibers shed from the sheet was measured. From the amount of the shed fibers, evaluation was made with three scales described below.

○: Little shedding occurred, and the sheet was acceptable.

Δ: Slight shedding occurred, but the sheet was usable.

x: Shedding occurred markedly, and the sheet was not usable.

(5) Dust collecting performance

The dust collecting performance was evaluated with four scales described below with respect to lint (cotton and polyester lint) and hair as model dust.

⊙: Perfectly acceptable dust collecting performance.

○: Almost acceptable dust collecting performance.

Δ: Dust could be collected, but large amounts of dust remained unremoved.

x: Dust could not be collected.

(6) Dust strike-through

Seven kinds of JIS test dust were employed as model dust, and 0.5 g of dust was collected with a sheet area of 60 cm$^2$. The degree of dust passed through the sheet was evaluated with three scales described below.

○: No strike-through.

Δ: Slight strike-through.

x: Marked strike-through.

EXAMPLE 1

A polypropylene net (distance between fibers: 9 mm, fiber diameter: 0.2 mm) was employed as a network sheet. Two polyester fiber webs were prepared by a conventional carding machine. The polyester fiber is 51 mm in length and 1.5 den in diameter. Each of the two webs was overlaid on the upper and lower side of the network sheet, respectively, such that resulting fiber aggregates each having a basis weight of 48 g/m$^2$ might be formed on opposite sides of the network sheet. The combination of the network sheet and the fiber webs was then subjected to a water needling process under low energy conditions. In this manner, a sheet was obtained which had a breaking strength of 1,320 g/30 mm, an elongation at a load of 500 g/30 mm of 4%, and an entanglement coefficient of 70 m.

EXAMPLE 2

A polypropylene net (distance between fibers: 9 mm, fiber diameter: 0.2 mm) was employed as a network sheet. Two polyester fiber webs were prepared by a conventional carding machine. The polyester fiber is 51 mm in length and 1.5 den in diameter. Each of the two webs was overlaid on the upper and lower side of the network sheet, respectively, such that resulting fiber aggregates each having a basis weight of 48 g/m$^2$ might be formed on opposite sides of the network sheet. The combination of the network sheet and the fiber webs was then subjected to a water needling process under low energy conditions (slightly higher than in Example 1). In this manner, a sheet was obtained which had a breaking strength of 1,500 g/30 mm, an elongation at a load of 500 g/30 mm of 4%, and an entanglement coefficient of 320 m.

EXAMPLE 3

A polypropylene net (distance between fibers: 9 mm, fiber diameter: 0.2 mm) was employed as a network sheet. Two polyester fiber webs were prepared by a conventional carding machine. The polyester fiber is 51 mm in length and 1.5 den in diameter. Each of the two webs was overlaid on the upper and lower side of the network sheet, respectively, such that resulting fiber aggregates each having a basis weight of 35 g/m$^2$ might be formed on opposite sides of the network sheet. The combination of the network sheet and the fiber webs was then subjected to a water needling process under low energy conditions (which were equivalent to those in Example 1). In this manner, a sheet was obtained which had a breaking strength of 1,290 g/30 mm, an elongation at a load of 500 g/30 mm of 4%, and an entanglement coefficient of 130 m.

EXAMPLE 4

A polypropylene net (distance between fibers: 9 mm, fiber diameter: 0.2 mm) was employed as a network sheet. Two polyester fiber webs were prepared by a conventional carding machine. The polyester fiber is 51 mm in length and 1.5 den in diameter. Each of the two webs was overlaid on the upper and lower side of the network sheet, respectively, such that resulting fiber aggregates each having a basis weight of 120 g/m$^2$ might be formed on opposite sides of the network sheet. The combination of the network sheet and the fiber webs was then subjected to a water needling process under low energy conditions (which were equivalent to those in Example 2). In this manner, a sheet was obtained which had a breaking strength of 1,700 g/30 mm, an elongation at a load of 500 g/30 mm of 4%, and an entanglement coefficient of 240 m.

COMPARATIVE EXAMPLE 1

A polyester fiber web having a basis weight of 48 g/m$^2$ was prepared by a conventional carding machine. The polyester is 51 mm in length and 1.5 den in diameter. The fiber web was then subjected to a water needling process under low energy conditions (the same level as in Example 1). In this manner, a sheet was obtained which had a breaking strength of 810 g/30 mm, an elongation at a load of 500 g/30 mm of 126%, and an entanglement coefficient of 80 m.

COMPARATIVE EXAMPLE 2

A polyester fiber web having a basis weight of 60 g/m$^2$ was prepared by a conventional carding machine. The polyester is 51 mm in length and 1.5 den in diameter. The fiber web was then subjected to a water needling process under medium energy conditions. In this manner, a sheet was obtained which had a breaking strength of 2200 g/30 mm, an elongation at a load of 500 g/30 mm of 26%, and an entanglement coefficient of 620 m.

TABLE 1

|  | Examples | | | | Comparative Examples | |
| --- | --- | --- | --- | --- | --- | --- |
|  | 1 | 2 | 3 | 4 | 1 | 2 |
| Basis weight of nonwoven | 48 | 48 | 35 | 120 | 48 | 60 |

TABLE 1-continued

|  | Examples | | | | Comparative Examples | |
|---|---|---|---|---|---|---|
|  | 1 | 2 | 3 | 4 | 1 | 2 |
| fiber aggregate (g/m²) Breaking strength (g/30 mm) Elongation | 1320 | 1500 | 1290 | 1700 | 810 | 2200 |
| (%) | 4 | 4 | 4 | 4 | 126 | 26 |
| Evaluation | ○ | ○ | ○ | ○ | x | Δ |
| Entanglement coefficient (m) | 70 | 320 | 130 | 240 | 80 | 620 |
| Shedding of fibers | ○ | ○ | ○ | Δ | x | Δ |
| Dust collecting performance |  |  |  |  |  |  |
| Lint | ⊙ | ○ | ○ | ○ | ⊙ | ○ |
| Hair | ⊙ | ○ | ○ | ○ | ○ | Δ |
| Dust strike-through | ○ | ○ | Δ | ○ | ○ | ○ |

Elongation: Elongation at a load of 500 g/30 mm

As will be clear from Table 1, as for the sheets of Comparative Examples 1 and 2, which do not contain the network sheet, it is necessary to enhance the entanglement or to carry out adhesion or fusion treatment in order to set the elongation at a load of 500 g/30 mm at a value of 10% or less, and in order to improve the fiber falling characteristics. However, in such cases, the entanglement coefficient of the sheet becomes higher than that of the sheet obtained in of Comparative Example 2, and the dust collecting performance becomes lower.

On the other hand, with the cleaning sheets obtained in of Examples 1, 2, 3 and 4 in accordance with the present invention, wherein the nonwoven fiber aggregates and the network sheet are combined with each other, and the degree of entanglement is made low (entanglement coefficient: 10 to 500 m), the strength required for the cleaning operation can be kept. Also, large-sized dust, such as lint, waste pieces of fibers and hair, which could not be collected with the conventional cleaning sheet, can be entangled and caught with the fibers having a high degree of freedom. Thus, the cleaning sheets in accordance with the present invention can reliably collect a wide variety of kinds of dust.

Many other variations and modifications of the invention will be apparent to those skilled in the art without departing from the spirit and scope the invention. The above-described embodiments are, therefore, intended to be merely exemplary, and all such variations and modifications are intended to be included within the scope of the invention as defined in the appended claims.

What is claimed is:

1. A cleaning sheet comprising (1) a network sheet and (2) a nonwoven fiber aggregate formed by the entanglement of fibers of a fiber web, disposed on at least one side of the network sheet, wherein the fibers of the nonwoven fiber aggregate are further entangled with the network sheet, forming a unitary body;

wherein the cleaning sheet has a breaking strength of 500 g/30 mm or more, and an elongation at a load of 500 g/30 mm of 10% or less;

wherein the nonwoven fiber aggregate has an entanglement coefficient of from 10 to 500 m, the entanglement coefficient being expressed by the initial gradient of the stress strain curve measured with respect to the direction perpendicular to the fiber orientation in the nonwoven fiber aggregate; and wherein the basis weight of the nonwoven fiber aggregate is within the range of about 40 to 100 g/m².

2. The cleaning sheet according to claim 1, wherein the breaking strength is 1000 g/30 mm or more.

3. The cleaning sheet according to claim 1, wherein the elongation at a load of 500 g/30 mm is 7% or less.

4. The cleaning sheet according to claim 1, which is adapted for attachment to a cleaning tool.

5. The cleaning sheet according to claim 1, wherein the nonwoven fiber aggregate has an entanglement coefficient of from 50 to 250 m.

6. The cleaning sheet according to claim 5, wherein the nonwoven fiber aggregate has an entanglement coefficient of from 70 to 120 m.

* * * * *

(12) EX PARTE REEXAMINATION CERTIFICATE (5174th)
United States Patent
Shizuno et al.

(10) Number: US 5,525,397 C1
(45) Certificate Issued: Aug. 9, 2005

(54) CLEANING SHEET COMPRISING A NETWORK LAYER AND AT LEAST ONE NONWOVEN LAYER OF SPECIFIC BASIS WEIGHT NEEDLED THERETO

(75) Inventors: Akihito Shizuno, Tochigi-ken (JP); Hiroyuki Yanagida, Tochigi-ken (JP)

(73) Assignee: Kao Corporation, Tokyo (JP)

Reexamination Request:
No. 90/005,740, Jun. 8, 2000

Reexamination Certificate for:
Patent No.: 5,525,397
Issued: Jun. 11, 1996
Appl. No.: 08/355,155
Filed: Dec. 8, 1994

(30) Foreign Application Priority Data

Dec. 27, 1993 (JP) .................................. 5-333310

(51) Int. Cl.$^7$ ................... A47L 13/10; A47K 7/02; B32B 3/10; B32B 5/02
(52) U.S. Cl. ................... 428/138; 15/208; 15/209.1; 15/229.11; 15/229.12; 442/388
(58) Field of Search ................... 428/138; 442/388; 15/208, 209.1, 229.11, 229.12

(56) References Cited

FOREIGN PATENT DOCUMENTS

| JP | HEI 5-25763 | 2/1993 |
| JP | HEI 5-192285 | 8/1993 |

OTHER PUBLICATIONS

Invalidation Proceeding: Certified English Translation of: (Indication of Appeal No. 10–35587), DECISION, Jul. 12, 1999, with Copy of Japanese Document.
Invalidation Proceeding: Certified English Translation of Opposition Document: REQUEST FOR APPEAL, Nov. 25, 1998, with Copy of Japanese Document.
Invalidation Proceeding: Certified English Translation of Opposition Document: REFUTATION, Apr. 8, 1999, with Copy of Japanese Document.
Invalidation Proceeding: Certified English Translation of Opposition Document: Second REFUTATION, May 10, 1999, with Copy of Japanese Document.
Invalidation Proceeding: Certified English Translation of Opposition Document: REPLY TO APPEAL, Mar. 9, 1999, with Copy of Japanese Document.

*Primary Examiner*—Elizabeth M. Cole

(57) ABSTRACT

A cleaning sheet comprises a network sheet and a nonwoven fiber aggregate formed by the entanglement of fibers of a fiber web and disposed on at least one side of the network sheet. The fibers of the nonwoven fiber aggregate are further entangled with the network sheet, forming a unitary body. The cleaning sheet has the breaking strength of 500 g/30 mm or more, and the elongation at a load of 500 g/30 mm is 10% or less. The fiber aggregate has the entanglement coefficient of from 10 to 500 m. The entanglement coefficient is expressed by the initial gradient of the stress-strain curve measured with respect to the direction perpendicular to the fiber orientation in the fiber aggregate.

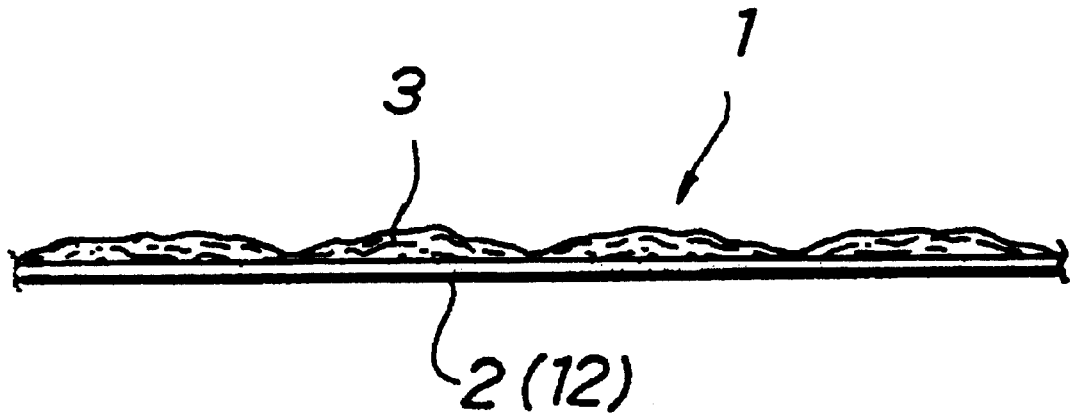

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–6 are cancelled.

* * * * *